Jan. 27, 1931. S. JONES 1,789,980
GAUGE FOR RAKES
Filed Sept. 16, 1929
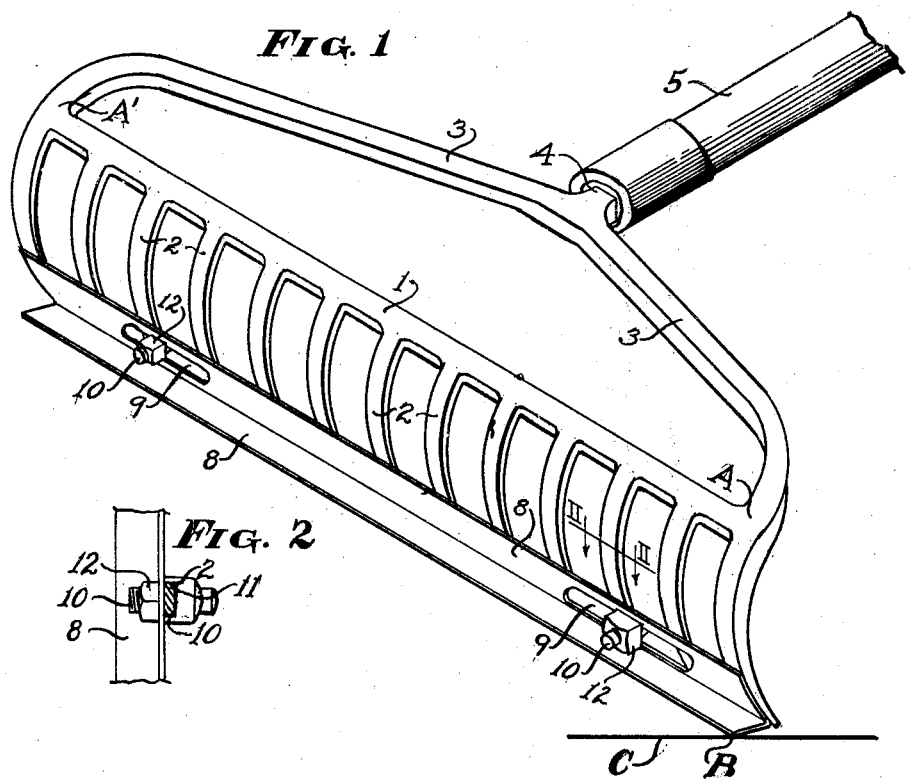
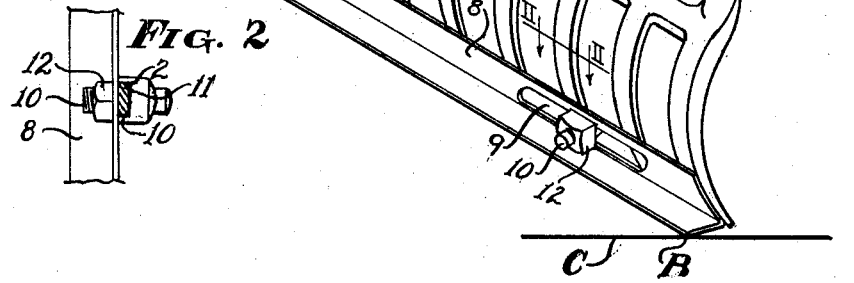
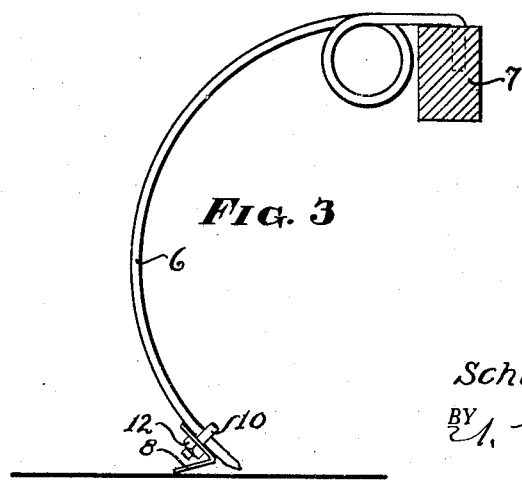
INVENTOR.
Schuyler Jones
BY
ATTORNEY.

Patented Jan. 27, 1931

1,789,980

UNITED STATES PATENT OFFICE

SCHUYLER JONES, OF WICHITA, KANSAS

GAUGE FOR RAKES

Application filed September 16, 1929. Serial No. 393,022.

My invention relates to a gauge for a rake by which means the points of the rake teeth are spaced from the ground.

The object of my invention is to produce a rake having a gauge so that the teeth will function as gathering means for Bermuda grass when cut, without interrupting the vine portion of the grass which is rooted in the ground as it trails along the surface thereof.

A still further object of my invention is to produce a gauge adjustably arranged and carried by the teeth of the rake.

A still further object of my invention is to provide a gauge that is rearwardly positioned and carried by the teeth of a rake, so the spacing of the points of the teeth from the ground may be varied as the handle is raised or lowered.

A still further object of my invention is to produce a gauge that is adaptable to various kinds of rakes and will function for the same purpose herein set forth.

These and other objects will be hereinafter more fully explained, reference being had to the accompanying drawings, forming a part of this specification, and in which like characters will apply to like parts in the different views.

Referring to the drawings, Fig. 1 is a perspective view of an ordinary hand rake, parts being removed for convenience of illustration. Fig. 2 is a sectional view taken along line II—II in Fig. 1. Fig. 3 is an elevation of a type of hay rake, the carrying beam of the teeth being in section.

My invention herein disclosed consists of a rake comprising a bar 1, having a plurality of teeth 2, spaced longitudinally of the bar and laterally extending therefrom; a yoke 3 is integrally connected to the ends of the bar as at A and A' and being bifurcated and connecting to the shank 4 as connecting means to a handle 5. In Fig. 3 is shown the tooth of a hay rake 6 as commonly manufactured, the tooth being attached to a beam 7, it being understood that a plurality of similar teeth is spaced along the beam and rocked thereby, so that hay may be discharged therefrom and placed in windrows.

The means of conveyance and mode of rocking the teeth is not shown in the drawings, but my invention herein disclosed is shown to be operated by this style of rake.

In Figs. 1, 2 and 3 is shown a gauge element 8, said gauge element having an elongated slot 9 near each end thereof, and longitudinally positioned with the gauge, by which means an eye bolt 10 is arranged for longitudinal adjustment. The eye 11 of the bolt is formed to receive a tooth 2 of the rake. When the nut 2 of the eye bolt is screwed tightly, the tooth is drawn snugly in contact with the gauge element 8. By the latter arrangement the gauge may be raised or lowered on the teeth. The drawings show the gauge to be an L shaped member, cross sectionally, by which means the outer edge of the horizontally disposed leg of said member is the fulcrum point as at B to vary the space of the points of the teeth from the ground line as illustrated at C, when the handle is rocked vertically.

While I have shown and described an L shaped member, I do not wish to be confined to this particular style of structure as a rectangular, cylindrical or tubular structure may be employed and attached in a very similar manner to that shown in the drawings, and the modification of rake structures will receive the gauge in operative position as illustrated in Fig. 3.

As stated clearly in the objects of this invention, a rake being equipped with a gauge as illustrated in the drawings, Bermuda grass, when cut may be collected without disturbing the vine portion of the plants, as the said portion trails along the ground in close proximity thereto and is rooted firmly at intervals along the vine, and should this portion be severed or detached, great damage would be the result and tend to decrease the progress of the growth whether it be for lawn purposes or the production of hay. Furthermore, it is practically impossible to rake a lawn of Bermuda grass when the teeth of a hand rake are allowed to come in contact with the vine portion of the grass. Therefore the cut portion of the grass is easily and cleanly removed by applying the gauge which supports the teeth slightly spaced from the ground and simultaneously tending to bear the vine portion of the grass downward to avoid contact of the teeth therewith and the same function is found practical when the gauge is applied to a hay rake.

It will be understood that two or more connections through the medium of the eye bolt may be made to the teeth of a rake of any style of manufacture, and such other modifications may be employed as lie within the scope of the appended claim, and having fully described my invention, what I claim as new and desire to secure by Letters Patent is:

As an article of manufacture, a gauge comprising an L shaped member having a plurality of slots in one leg thereof and a bolt having an eye, there being one bolt to each of the slots, the slots for longitudinal adjustment for the position of the bolts, the eye of said bolts adapted to receive a tooth of a rake, and adapted to slide longitudinally on the tooth, each bolt having a nut threadedly engaged thereon as means to bind the gauge firmly to the teeth.

In testimony whereof I affix my signature.

SCHUYLER JONES.